United States Patent [19]

Toriumi et al.

[11] 4,244,642
[45] Jan. 13, 1981

[54] APERTURE CARD READER WITH AUTOMATIC AND MANUAL CARD FEED

[75] Inventors: Shiro Toriumi, Zama; Hiroshi Endo, Fuchu; Takao Saijo, Matsudo; Takanori Saito, Musashino; Kuniaki Kamimura, Kawasaki, all of Japan

[73] Assignee: Minolta Camera Kabushiki Kaisha, Osaka, Japan

[21] Appl. No.: 49,967

[22] Filed: Jun. 19, 1979

[30] Foreign Application Priority Data

Jun. 26, 1978 [JP]   Japan ............................. 53-88293[U]

[51] Int. Cl.³ ..................... G03B 23/14; B65H 5/26
[52] U.S. Cl. ............................. 353/27 R; 271/3; 271/225; 271/236; 271/265; 271/272; 355/76
[58] Field of Search ............... 271/3, 9, 225, 264, 271/265, 236, 272, 273, 274, 162, 164, 8 R, 8 A; 353/25, 27 R, 27 A; 355/75, 76, 44, 45, 54

[56] References Cited

U.S. PATENT DOCUMENTS

| 2,632,643 | 3/1953 | Egan et al. ........................ 271/3 |
| 3,445,159 | 5/1969 | Hoppmann ....................... 353/35 |
| 3,578,317 | 5/1971 | Burnham et al. ................ 271/69 |
| 3,926,426 | 12/1975 | Toriumi et al. .................. 271/3 |
| 4,043,661 | 8/1977 | Yamada et al. .................. 355/50 |
| 4,191,455 | 3/1980 | Watanabe et al. ............. 353/27 A |

*Primary Examiner*—Bruce H. Stoner, Jr.
*Attorney, Agent, or Firm*—Wenderoth, Lind & Ponack

[57] ABSTRACT

An aperture card reader is equipped with a unit detachably mountable on the main body for automatically feeding aperture cards. The aperture card can automatically be placed between presser plates while the unit is mounted on the main body or, alternatively, can be manually fed when the unit is detached from the main body. The aperture card is automatically fed between the presser plates with the card in a position in which the minor sides of the aperture card are oriented in the direction of feed, while the card can be manually placed between the presser plates by feeding the card in a position in which the major sides of the card are oriented in the direction of feed. The image of the microfilm mounted on the aperture card can be projected on a screen in a horizontal position when the card is fed automatically, or in a vertical position when the card is fed manually.

11 Claims, 11 Drawing Figures

APERTURE CARD READER WITH AUTOMATIC AND MANUAL CARD FEED

BACKGROUND OF THE INVENTION

The present invention relates to an aperture card reader by which the images on microfilms mounted on aperture cards are projected on a screen on an enlarged scale.

Aperture cards are laterally elongated cards of a specified size having a microfilm mounted in an apertured center portion thereof, the microfilm bearing microcopied information of documents, drawings, etc. Aperture cards have already been dimensionally standardized. Since such aperture cards are useful for filing immense amounts of information, they have found wide use for filing purposes. Various aperture card readers have been developed and commercially provided for viewing the microcopy images on the aperture cards by enlarging them and projecting them on a screen. Many of these aperture card readers serving as viewers also include printers for printing microfilm images on copy paper on an enlarged scale. (Such an apparatus is also called a "reader-printer.")

It is desirable that aperture card readers be equipped with a mechanism by which aperture cards can be automatically fed to and delivered from a pair of presser plates for holding the card therebetween for the projection of the image so that a large number of aperture cards can be copied rapidly while being easily handled. Many readers are presently available which are provided with such a mechanism. They are easy to operate, adapted to copy a large number of aperture cards efficiently and are accepted as very desirable for the user. Notwithstanding these advantages, the product nevertheless invariably has a disadvantage causing the following inconvenience to the user. In fact, the drawback to be described below has been the cost of achieving the foregoing benefits.

An aperture card has an aperture with a minor to major side ratio of about 2:3 and is usually used in a horizontal position, namely with the major sides of the aperture positioned horizontally. When a microfilm is mounted on the aperture card, the information on the film will be oriented vertically or horizontally depending on whether the information is microcopied on the film in its horizontal or vertical position. This is established when attaching existing microfilms to aperture cards for filing. With the conventional aperture card readers described above, on the other hand, the presser plates for holding the aperture card are adapted to hold the card only in a specified position, while the mechanism for automatically feeding and delivering aperture cards is also designed to feed the card to the presser plates is only one direction, i.e. the direction in which the minor sides are oriented or the direction in which the major sides of the card are oriented. Accordingly when microfilm images are enlarged and projected on the screen of the conventional aperture card reader for viewing, the images will invariably be projected in one of two positions, oriented either vertically or horizontally. In the latter case, the user suffers the inconvenience that the enlarged images will be lying on their side, so to speak.

SUMMARY OF THE INVENTION

The main object of the present invention is to provide a very useful aperture card reading having a novel construction.

Another object of the invention is to provide an aperture card reader which does not have the above-described problem which the known aperture card readers have.

Another object of the invention is to provide an aperture card reader suited for universal use.

Another object of the invention is to provide an aperture card reader having simple construction.

Another object of the invention is to provide an aperture card reader which is easy to operate.

These and other objects of the invention are achieved by an aperture card reader comprising a pair of aperture card holding presser plates each having a transparent portion through which the image on a microfilm mounted in an apertured portion of an aperture card is projected, the pair of presser plates being disposed with the long dimension in a horizontally oriented position extending transversely of the direction of feed of the aperture card and supported so as to be relatively movable toward and away from each other, a reader main body housing having a first card feeding opening for permitting the aperture card to be fed to and withdrawn from between the presser plates manually from outside the housing with either the major sides or the minor sides of the card oriented in the feeding direction, guide plates defining a second opening for feeding the aperture card to the presser plates in a direction in which only the minor sides of the card are oriented in the feeding direction and being disposed to guide the aperture card from the second opening to a space between the presser plates through the first opening, a pair of feed rollers for automatically transporting the aperture card from the second opening along the guide plates, a support member fixedly supporting the guide plates and the feed rollers and movably mounted on the housing so as to permit removal of the guide plates and the feed rollers from the first opening of the housing, and a pair of discharge rollers for discharging the aperture card from the housing after the card has been fed to the presser plates and held therebetween.

With the aperture card reader having such a construction, aperture cards can be fed to the presser plates automatically while the support member is mounted on the main body housing or, alternatively can be fed to the presser plates manually when the support member is moved relative to the housing to remove the guide plates and the feed rollers from the first opening. By a changeover from automatic to manual feeding and vice versa, a microfilm image on a single aperture card can be enlarged and projected on the screen oriented either vertically or horizontally.

Stated more specifically the aperture card reader has the following construction.

(1) The presser plates are each provided with a positioning member by which the apertured portion (i.e. the microfilm carrying portion) of the aperture card to be placed between the presser plates by moving it in the direction in which the minor or major sides of the card are oriented can be positioned properly relative to the transparent portions of the presser plates.

(2) The aperture card reader is provided with means for detecting the leading end of the aperture card inserted into the second opening and means for controlling the operation of the feed rollers and discharge rollers and the opening and closing of the presser plates in response to a leading end detecting signal from the detecting means.

(3) The presser plates are held open by the controlling means at least while the feed rollers or discharge rollers are driven.

(4) In response to the detection of the leading end of an aperture card by detecting means, the discharge rollers are driven by the controlling means for a period of time at least sufficient to discharge the aperture card held between the presser plates from the main body housing.

(5) The rotation of the feed rollers is initiated by the controlling means when the discharge rollers stop.

(6) The aperture card reader is further provided with means for detecting the rear end of the aperture card passing between the feed rollers and for feeding a rear end detecting signal to the controlling means.

(7) The feed rollers are stopped by the controlling means in response to the detection of the rear end of the card by the rear end detecting means.

(8) The direction in which the aperture card is placed between the presser plates is at right angles to the direction in which the aperture card is withdrawn by the discharge rollers.

(9) The discharge rollers are adapted to move into or out of contact with the aperture card between the presser plates, and are held away from the aperture card by the controlling means at least when the aperture card is fed to the space between the presser plates.

(10) Immediately before the aperture card is completely inserted between the presser plates, the discharge rollers are driven by the controlling means for a period of time in a direction opposite to the usual direction to properly position the aperture card in place.

These and other objects, advantages and features of the invention will become apparent from the following description thereof when read in conjunction with the accompanying drawings which illustrate exemplary embodiments of the invention.

BRIEF DESCRIPTION OF THE DRAWINGS

In the following description, like parts are designated by like reference numbers throughout the several Figures of the drawings.

DETAILED DESCRIPTION OF THE INVENTION

The aperture card reader according to the invention operates to enlarge and project the microfilmed image on an aperture card onto a screen and also serves as a printer for printing the enlarged image on copy paper, and therefore is, technically, a reader printer.

In the following detailed description of the aperture card reader, the aperture card reader will be referred to simply as the "reader" and the aperture card merely as the "card" for convenience.

Figure 1:
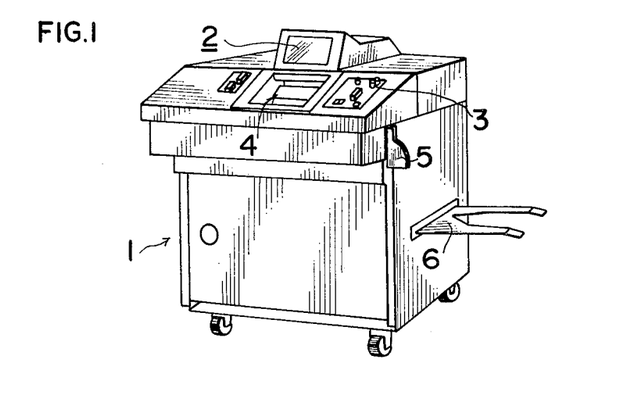
FIG. 1 is a perspective view showing the appearance of an aperture card reader embodying the present invention.

The reader 1 shown in FIG. 1 is provided on the top with a screen 2 on which enlarged scale images are projected, an operating panel 3 and a card inlet 4, and has on one side thereof a card tray 5 for receiving the discharged cards and a copy tray 6 for receiving copy paper carrying copied images.

Figure 2:
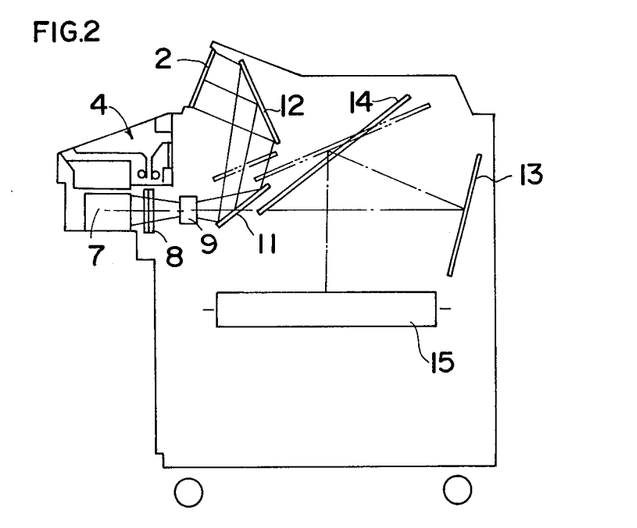
FIG. 2 is a diagram schematically showing the interior construction of the aperture card reader.

As seen in FIG. 2, the reader 1 includes in its interior a light source 7 for illuminating the microfilm mounted on the card, a card holding assembly 8 for holding the card in the image projecting position, a projecting lens 9, etc.

When the image on the card is enlarged and projected on the screen 2 by the reader 1, a movable mirror 11 and a fixed mirror 12 provide an optical path from the lens 9 to the screen 2. When the image on the card is enlarged and printed on copy paper, the movable mirror 11 and another movable mirror 14 shift to the broken-line positions shown, whereby the movable mirror 14 and fixed mirror 13 provide an optical path from the lens 9 to a photoconductive drum 15. The photoconductive drum 15 is the same as that used in conventional electrophotgraphic copying machines and has image forming elements (not shown) arranged therearound to form copy images on the copy paper. The paper carrying the images thereon is automatically delivered to the copy tray 6 by means the same as in a conventional copying machine.

Figure 3:
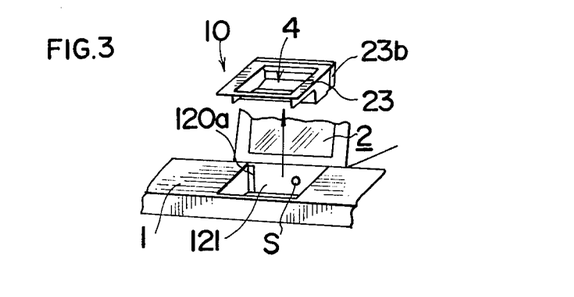
FIG. 3 is a perspective view on an enlarged scale showing a portion of the aperture card reader and an automatic aperture card feeding unit fittable in said portion.
Figure 4:
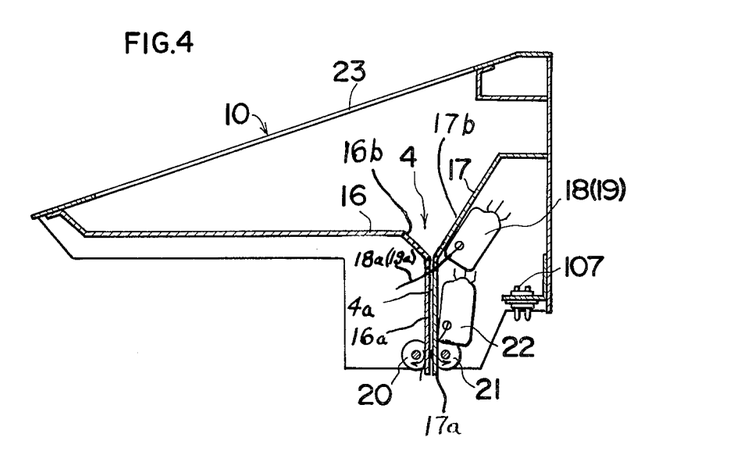
FIG. 4 is a sectional view showing the center portion of the automatic aperture card feeding unit.
Figure 5:
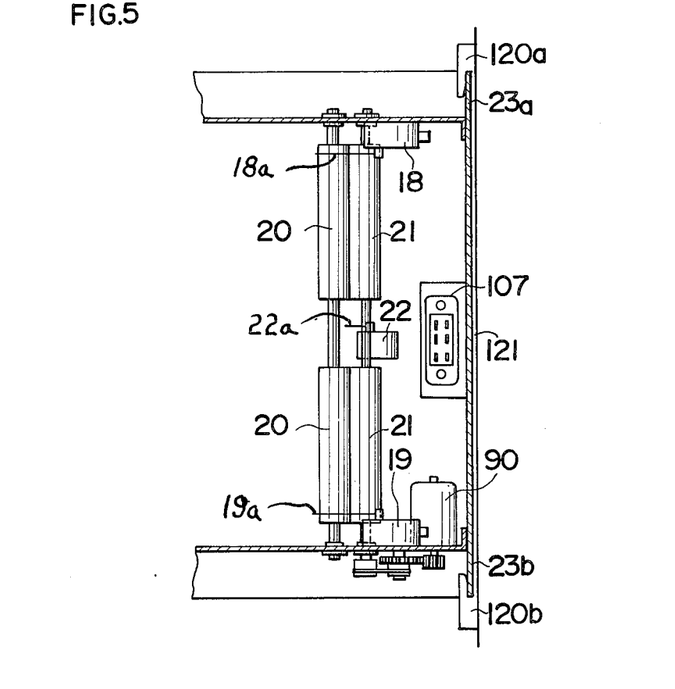
FIG. 5 is a view partly in section showing the unit.

An automatic card feeding unit 10 for use in the reader 1 is shown in detail in FIGS. 3 to 5. The unit 10 is detachably mountable on the reader 1 as shown in FIG. 3. The unit 10 is shown in section in FIGS. 4 and 5. The unit has a card passage 4a defined by a pair of guide plates 16 and 17 (shown in FIG. 4 but not in FIG. 5) having spaced opposed vertical portions 16a and 17a and diverging portions 16b and 17b on the upper edges of the vertical portions defining a card inlet 4 to the passage 4a. The longitudinal dimension of the passage 4a, i.e. the dimension perpendicular to the plane of the drawing (FIG. 4), is equal to the longitudinal dimension of the card. The card feeding passage 4a defined by the guide plates 16 and 17 is provided with microswitches 18 and 19 disposed immediately behind the inlet 4 and having feelers 18a and 19a extending across the passage between the vertical portions of plates 18 and 19 for detecting the presence of the leading end of a card being inserted into the inlet 4. The microswitches 18 and 19 are positioned close to the ends of the feeding passage 4a for detecting the leading edge of a card only when the card is inserted into the inlet 4 in a position in which the minor sides of the card are oriented in the direction of insertion as will be apparent from the description of operation to be given later. Provided further along the passage 4a from the microswitches 18 and 19 in the direction of travel of the card is a pair of card feeding rollers 20 and 21 which is driven only when the leading edge of a card has been detected by the switches 18 and 19 and which transport the card along the feeding passage. Near the nip of the feeding rollers 20 and 21, is a microswitch 22 having a feeler 22a extending across the passage 4a between plate portions 16a and 17a for detecting the passage of the rear end of a card passing through the nip. The guide plates 16 and 17, microswitches 18, 19 and 22 and feeding rollers 20 and 21 are mounted on a frame 23.

The automatic card feeding unit 10 is provided with a small-sized motor 90 for driving the feeding rollers 20 and 21 and with a connector 107 for connecting the microswitches 18, 19 and 22 and motor 90 to an electric circuit in the main body of the reader 1. The unit 10 has projections 23a and 23b engageable in grooves 120a and 120b formed in the reader main body for guiding the unit 10 along a flat surface 121 for installation in or removal from the reader 1.

A switch S (a contact of which is normally closed) for operating a presser solenoid to be described later to open or close presser plate means (described later) is mounted on the reader main body at a portion which is exposed only when the unit 10 has been detached from the reader 1. The main body housing of the reader 1 has, at the portion where the unit 10 is installed, an opening corresponding to the card feeding passage of the unit 10 for permitting the insertion of the card into the presser plate means. The opening further permits access to the presser plate means from outside while the unit 10 is detached from the main body, so that a card can be manually inserted into or withdrawn from the presser plate means in a direction in which the major sides of the card are oriented, as will become apparent later.

The card holding assembly 8 on the reader main body is shown in FIGS. 6 to 10. The assembly 8 has a rear fixed presser plate 27 on which is detachably supported a transparent glass plate 25 which has a knob 26 thereon for handling it (see FIG. 7). The presser plate 27 constitutes one of a pair of presser plates the other of which is a movable presser plate 68 to be described later, for holding a card therebetween. The portions of the presser plates corresponding to the microfilm on the card to be held therebetween are made of transparent glass as will be described later. The presser plate 27 extends horizontally in a direction transverse to the direction of insertion of the card into the presser plate means. The presser plate 27 has fixed to the front side thereof a member 30 having an edge 28 providing a horizontal reference surface and another edge 29 providing a vertical reference surface for positioning a card 24. Attached to the front side of the positioning member 30 are plate springs 31 and 32 by which a card 24 transported to the card holding assembly 8 is pressed against the glass plate 25 and the horizontal reference surface 28 respectively. The plate spring 31 has one end fastened to the positioning member 30 by screws and the other end projecting beyond the reference edge 29 and has semispherical pressing members 33 on the other end opposed to the glass plate 25. The pressing members 33 are usually in contact with the glass plate 25 except when a card 24 is present in the assembly 8.

The other plate spring 32 is mounted on the positioning member 30 approximately at the same level as the upper major side of the card 24 when the card 24 is in position in the assembly 8. The spring 32 has one end fastened to the positioning member 30 and the other end divided into one portion 34 exerting a force directed toward the presser plate 27 and another portion 35 bent so as to exert a force at right angles to the portion 34 for biasing the card 24 against the horizontal reference surface 28. The portion 34, like the plate spring 31, has a semispherical pressing member 36 therein. The portion 35 is accommodated in a groove 37 formed in the positioning member 30 and has an upwardly bent forward end which has a rounded corner 35a opposed to the pressing plate 27. Thus the aperture portion 24' of a card 24 fed onto the presser plate 27 in the direction shown by the arrow in FIG. 7 or in the direction shown by the arrow in FIG. 8 will be properly placed in position relative to the transparent portion of the presser plate 27.

Figure 7:
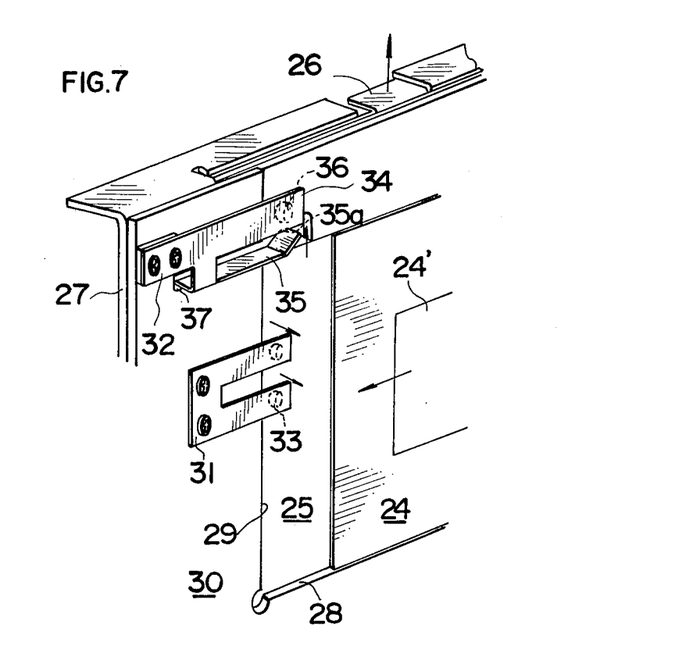
FIGS. 7 and 8 are fragmentary enlarged perspective views showing the aperture card holding assembly.
Figure 8:
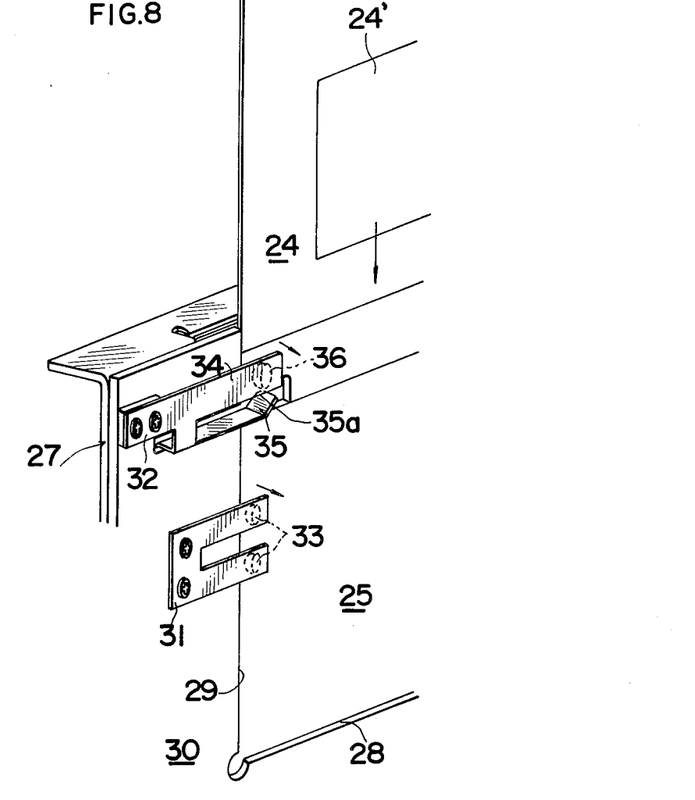
Figure 9:
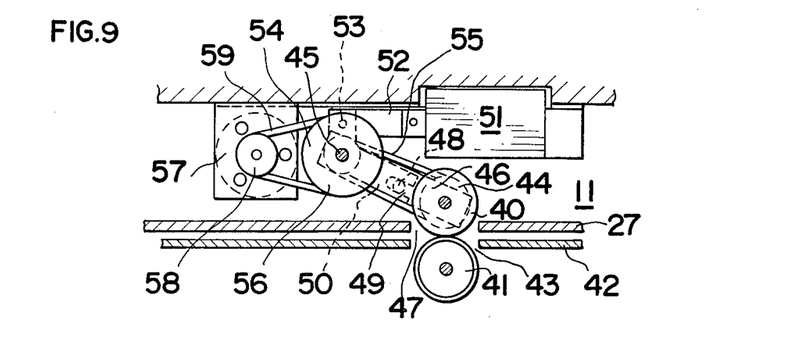
FIG. 9 is a view taken along the line IX—IX in FIG. 6.

As seen in FIG. 9, the holding assembly 8 is provided with a feed roller 40 and an idle roller 41 for bringing a card 24 into contact with the vertical reference surface 29. The rollers 40 and 41 also serve as delivery rollers; a card 24 fed between the presser plates 27 and 68 in the horizontal direction as shown in FIG. 7 and held therebetween is discharged from the main body housing of the reader 1 onto the card tray 5 by these rollers. The idle roller 41 is rotatably supported on a cover plate 42 disposed in front of the positioning member 30 and projects toward the presser plate 27 from an opening 43 in the cover plate 42. The feed roller 40 is mounted on a shaft supported by a lever 46 pivotable about a shaft 45 and contacts the idle roller 41 through an opening 47 in the presser plate 27. A pulley 44 is also mounted on the same shaft as the roller 40. The shaft 45 has pivotally mounted thereon a lever 50 having a slot 49 therein in which is engaged a pin 48 on the lever 46. A solenoid 51 fixedly mounted on the presser plate 27 has a plunger 52 which is pivotally connected by a pin 53 to the lever 50.

A belt 55 is reeved around the pulley 44 and a pulley 54 on the shaft 45. The pulley 54 is integral with a pulley 56 which is coupled by a belt 59 to a pulley 58 on a reversible motor 57. The motor 57 is fixedly mounted on the presser plate 27.

The aforementioned movable presser plate 68 is movably supported in the card holding assembly 8. The presser plate 68 serves as means for holding a card 24 in position pressed in contact with the glass plate 25 on the presser plate 27. As shown most clearly in FIGS. 6 and 10, a support plate 61 having a pivot 60 thereon is attached to the positioning member 30. A presser support 62 is pivotally mounted on the pivot 60. A return spring 63 wound on the pivot 60 has one end against the presser support 62 the other end thereof against the support plate 61, biasing the presser support 62 clockwise in FIG. 10. The presser support 62 has support arms 64 and 65 at opposite ends of the pivot 60. The arm 64 has a pressing pin 66 at the upper end thereof, and both arms 64 and 65 each have a slot 67 therein along a circle concentric with the pivot 60. The slots 67 have engaged therein a pin 69 which is mounted on the center of each side face of the presser plate 68, so that the presser plate 68 is pivotable relative to the presser plate 27. The springs 70 wound on the pivot 60 bias the pins 69 into the slots 67. The movable presser plate 68 has spaced opposed grooves 71 in the opposite side portions on the side toward the glass plate 25 for removably receiving a transparent glass plate 72 therein.

Figure 6:
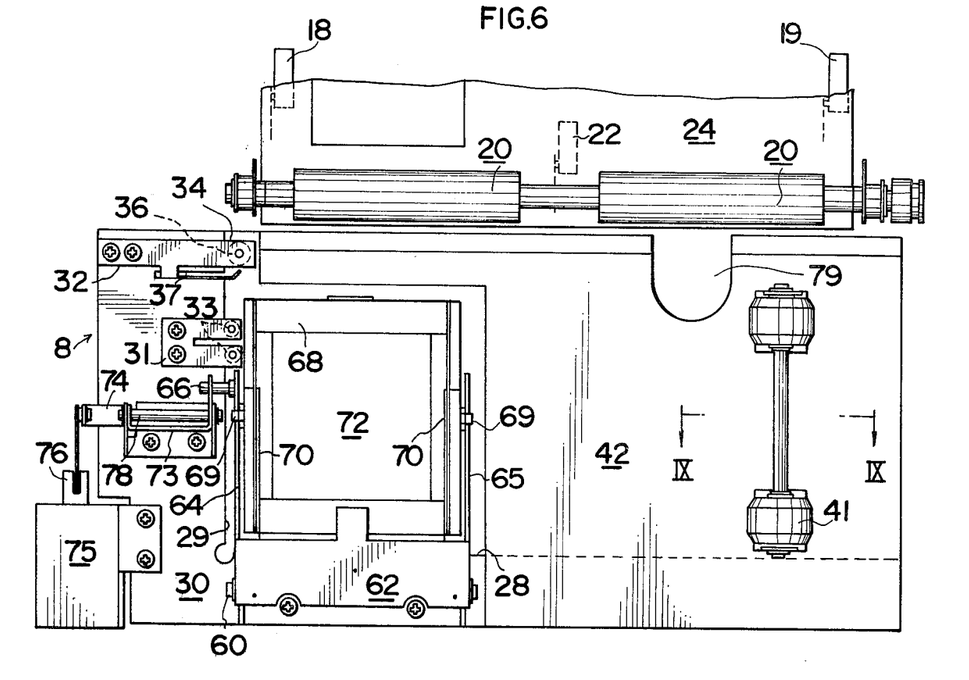
FIG. 6 is a fragmentary front view showing an aperture card holding assembly in the interior of the aperture card reader.
Figure 10:
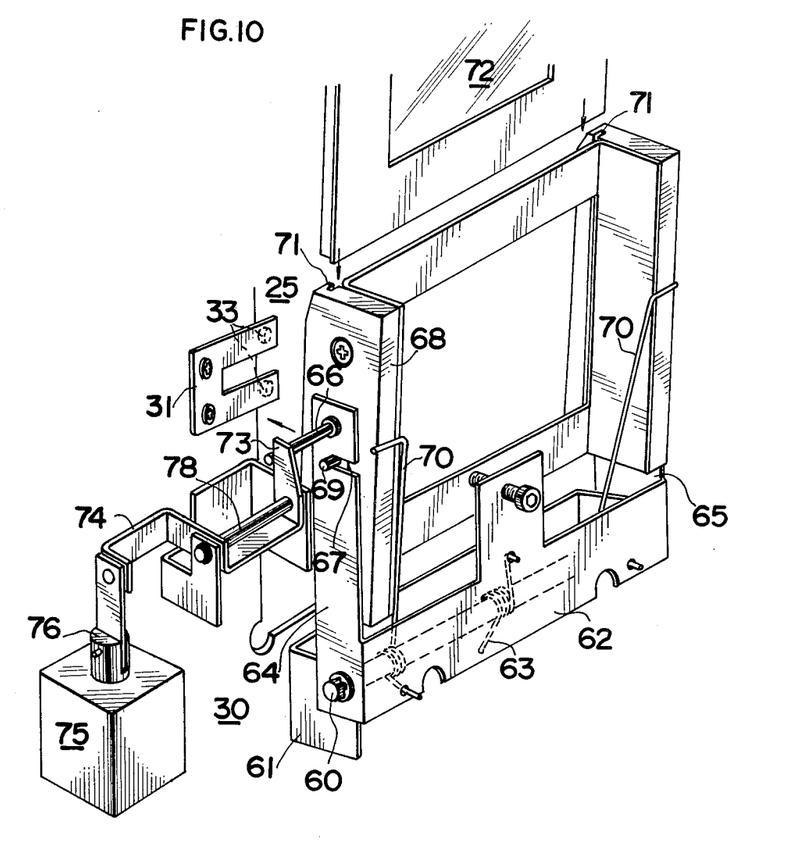
FIG. 10 is a fragmentary perspective view on an enlarged scale showing the aperture card holding assembly of FIG. 6.

The positioning member 30 further has a lever 73 in engagement with the pressing pin 66 and turnable about a pivot 78 (see FIGS. 6 and 10). The lever 73 is turned by a lever 74 which is pivotally linked to the plunger 76 of a solenoid 75. The presser plate 27 and cover plate 42 have cutout portions 79 therein for removing a jammed card.

The card holding assembly 8 is movable by unillustrated scanning means for printing.

The operation of the reader 1 will be described below with reference to the electric circuit diagram of FIG. 11.

When the automatic card feeding unit 10 is mounted on the main body of the reader 10, the main switch (not shown) on the operation panel 3 on the front of the reader 1 is closed, whereby terminals 110 to 116 are connected to a d-c power supply. A majority "L" OR gate 103 produces a "LOW" (hereinafter abbreviated as "L") output, which causes an inverter 104 and transistor 105 to energize the solenoid 75. The solenoid 75 in turn drives the lever 74 to move the glass plate 72 on the movable presser plate 68 into contact with the glass plate 25 on the presser plate 27, thus bringing the presser plates 27 and 68 together.

With the apparatus in this state, a card is inserted into the inlet 4 with the minor sides of the card oriented in the direction of insertions, closing the switches 18 and 19 at the same time, whereupon a NAND gate 83 supplies a "HIGH" (hereinafter abbreviated as "H") input to a monostable multivibrator 85, which produces an "H" output. At the same time, a set-reset flip-flop 87 receives an "L" reset input R and becomes settable. When an output "H" is produced from the monostable multivibrator 85, the output of the OR gate 103 changes to "H" to deenergize the solenoid 75, and the spring 63 pivots the presser plate 68 away from the presser plate 27.

Simultaneously with the change of the output from the monostable multivibrator 85 to "H", transistors 102 and 100 are made conductive, and a transistor 99 is made non-conductive. Since no power is supplied to the base of transistor 95 at this time transistors 95 and 98 are non-conductive while the transistor 97 is conductive, current flows from the terminal 116 through the motor 57 the solenoid 51 in the direction of the solid-line arrow in FIG. 11, bringing the rollers 40 and 41 into contact with each other and also rotating them for discharging a card 24 from between the presser plates onto the card tray 5. This card discharging action takes place irrespective of the presence or absence of a card 24 between the presser plates.

After the lapse of a predetermined period of time (i.e. a period of time sufficient for the card between the presser plates to be discharged from the main body housing, which is usually about 0.1 to about 0.3 second and which passes before the card 24 inserted into the inlet 4 reaches the nip of the rollers 20 and 21 after actuating the switches 18 and 19) after the energization of the motor 57 and solenoid 51, the monostable multivibrator 85 is deenerized, and the output thereof changes to "L". This is detected by a voltage drop detecting circuit 86, which gives the set-reset flip-flop 87 a trigger pulse as set input S. The flip-flop 87 produces reverse output $\overline{Q}$ of level "L". Simultaneously with the change of the output from the multivibrator 85 to "L", the transistors 102 and 100 are made non-conductive and the transistor 99 is made conductive, deenergizing the motor 57 and solenoid 51 to complete the discharging operation. Although the input to the OR gate 103 from the monostable multivibrator 85 changes to "L", the input to a NAND gate 88 changes to "H" due to the above-mentioned change of the reverse output $\overline{Q}$ of the set-reset flip-flop 87 to "L" and the output of the OR gate 103 remains "H". Thus the solenoid 75 remains deenergized and the presser plates remain in the open state.

When the output from the NAND gate 88 changes to "H", a transistor 89 becomes conductive, energizing the motor 90 to drive the feed rollers 20 and 21, which start to transport the card 24 toward the presser plates along the guide plates 16 and 17. The leading end of the card 24 engages the feeler 22a which actuates the switch 22, changing the output of an inverter 92 to "H", but this is not detected by a voltage drop detecting circuit 93. Although the input from the switch 22 to the NAND gate 88 changes to "L", this produces no effect on the output of the NAND gate 88, permitting the above operation to continue.

The switches 18 and 19 are turned off as the card 24 travels further and the trailing end of the card passes the feelers 18a and 19a, changing the reset input R to the set-reset flip-flop 87 to "H" and setting the flip-flop, whereupon the reverse output $\overline{Q}$ thereof changes to "H". The input to the NAND gate 88 from the reverse output $\overline{Q}$ therefore also changes to "H". However, since the input to the gate 88 from the switch 22 has already been changed to "L" as already stated, no change occurs in the input of the NAND gate 88, permitting continuation of the above operation. The output of the NAND gate 83 changes to "L" when the switches 18 and 19 are turned off, but the monostable multivibrator 85 will not be triggered.

Upon further travel of the card 24, the card reaches the space between the open presser plates and abuts the horizontal surface 28 of the positioning member 30. At the same time, the switch 22 is turned off upon the passage of the rear end of the card 24 through the nip of the feed rollers 20 and 21. With the opening of the switch 22, the output from the NAND gate 88 changes to "L", making the transistor 89 non-conductive and deenergizing the motor 90 and thereby stopping the feed rollers 20 and 21.

At this time, the output from the inverter 92 changes to "L", which is detected by the voltage drop detecting circuit 93. This circuit feeds a trigger pulse to a monostable multivibrator 94. The thus triggered multivibrator 94 produces an "H" output, making the transistor 95 conductive and transistor 97 non-conductive and the transistor 98 conductive. On the other hand, the transistors 102 and 100 remain non-conductive and the transistor 99 conductive. Consequently current from the terminal 116 flows through the motor 57 and solenoid 51 in the direction shown by the broken line in FIG. 11, whereupon the spaced apart rollers 40 and 41 are moved into contact with each other and are also rotated to move the card 24 between the presser plates in a direction in which it contacts the vertical surface 29.

The change of the output from the NAND gate 88 to "L" changes the input to the OR gate 103 connected to the NAND gate 88 to "L". However, the input to the OR gate 103 from the monostable multivibrator 94 is changed to "H" at the same time, so that the OR gate 103 continues to supply an "H", the solenoid remains deenergized so that the presser plates remain spaced apart.

When the card 24 comes into contact with vertical surface 29, the upper end contacts the lower surface of the biasing portion 35 of the plate spring 32, pressing the card down so that the card 24 is transported by the rollers 40 and 41 with the lower end in sliding contact with the horizontal face 28. At the same time, the card 24 pushes the semispherical pressing members 33 away from the glass plate 25 as shown by the arrow in FIG. 7 so that the card is pressed against the glass plate 25 by the action of the plate spring 31. This assures that the forward side of the card 24 will be brought into contact with the vertical surface 29 and held in contact therewith. Consequently the card 24 is properly positioned between the presser plates with the lower end in contact with the horizontal surface 28 and the side edge with the vertical surface 29. When the card 24 is thus placed in the reference position, the apertured portion 24′ of the card 24 is aligned between the glass portions of the presser plates.

After a period of time (i.e. a period of time sufficient to properly position the card 24 in the reference position) following the opening of the switch 22, the monostable multivibrator 94 is deenergized and the output thereof changed to "L". This makes the transistors 95 and 98 non-conductive and the transistor 97 conductive, while the transistors 102 and 100 remain non-conductive and the transistor 99 remains conductive. As a result, the motor 57 and solenoid 51 are deenergized, and the rollers 40 and 41 are moved away from each other and the rollers come to a halt.

Simultaneously with this, the output of the OR gate 103 changes to "L", making the transistor 105 conductive so as to energize the solenoid 75, which causes the glass plate 72 on the movable presser plate 68 to be pressed against the glass 25 on the presser plate 27 with the card 24 sandwiched therebetween. In other words, the presser plates are closed.

With the card 24 thus held between the presser plates, the microfilm image on the card is in condition for enlargement and projection onto the screen 2. At the same time, the image can be printed on copy paper in an enlarged form.

On completion of the projection or copying of the image, a card discharge switch 81 is closed, whereupon the output of the NAND gate 83 changes to "H" which triggers the monostable multivibrator 85, the output of which changes to "H". This changes the output from the OR gate 103 to "H", causing the inverter 104 and transistor 105 to deenergize the solenoid 75, which in turn permits the presser plates to be opened to free the card 24 therefrom.

At the same time, the transistors 102 and 100 become conductive and the transistor 99 becomes non-conductive and the transistors 95 and 98 remain non-conductive and the transistor 97 remains conductive. Accordingly current from the terminal 116 flows through the motor 57 and solenoid 51 in the direction of the solid line arrows in FIG. 11, moving the rollers 40 and 41 into contact with each other and rotating them to discharge the card 24 between the presser plates from the main body housing into the card tray 5.

A predetermined time after the discharge of the card 24 from the housing, the monostable multivibrator 85 is deenergized. The resulting change in the output thereof to "L" is detected by the voltage drop detecting circuit 85, which feeds a trigger pulse to the set-reset flip-flop 87 which is a set input S. The flip-flop 87 nevertheless will not be set because the switches 18 and 19 are open and the reset input R therefore remains "H". Thus, the flip-flop 87 is held in its reset state. On the other hand, the change of the output of the monostable multivibrator 85 to "L" causes the transistor 102 to become non-conductive which deenergizes the motor 57 and solenoid 51 and terminates the card discharging operation. The output from the OR gate 103 also changes to "L" which causes the solenoid 75 be energized to close the presser plates.

The foregoing operation is used only when a card 24 is to be inserted into the inlet 4 in a position in which the minor sides of the card are oriented in the direction of insertion, and the apparatus will only operate in this fashion when the unit 10 is attached if cards are fed in this orientation. If the card is fed in with the major sides thereof oriented in the direction of insertion, the reader will not operate because the operation described requires simultaneous closing of the switches 18 and 19, and such simultaneous closing cannot take place when the card is oriented with the major sides in the direction of the feed.

When the unit 10 is removed from the reader main body, the reader 1 can be operated with the card oriented in either direction.

Figure 11:
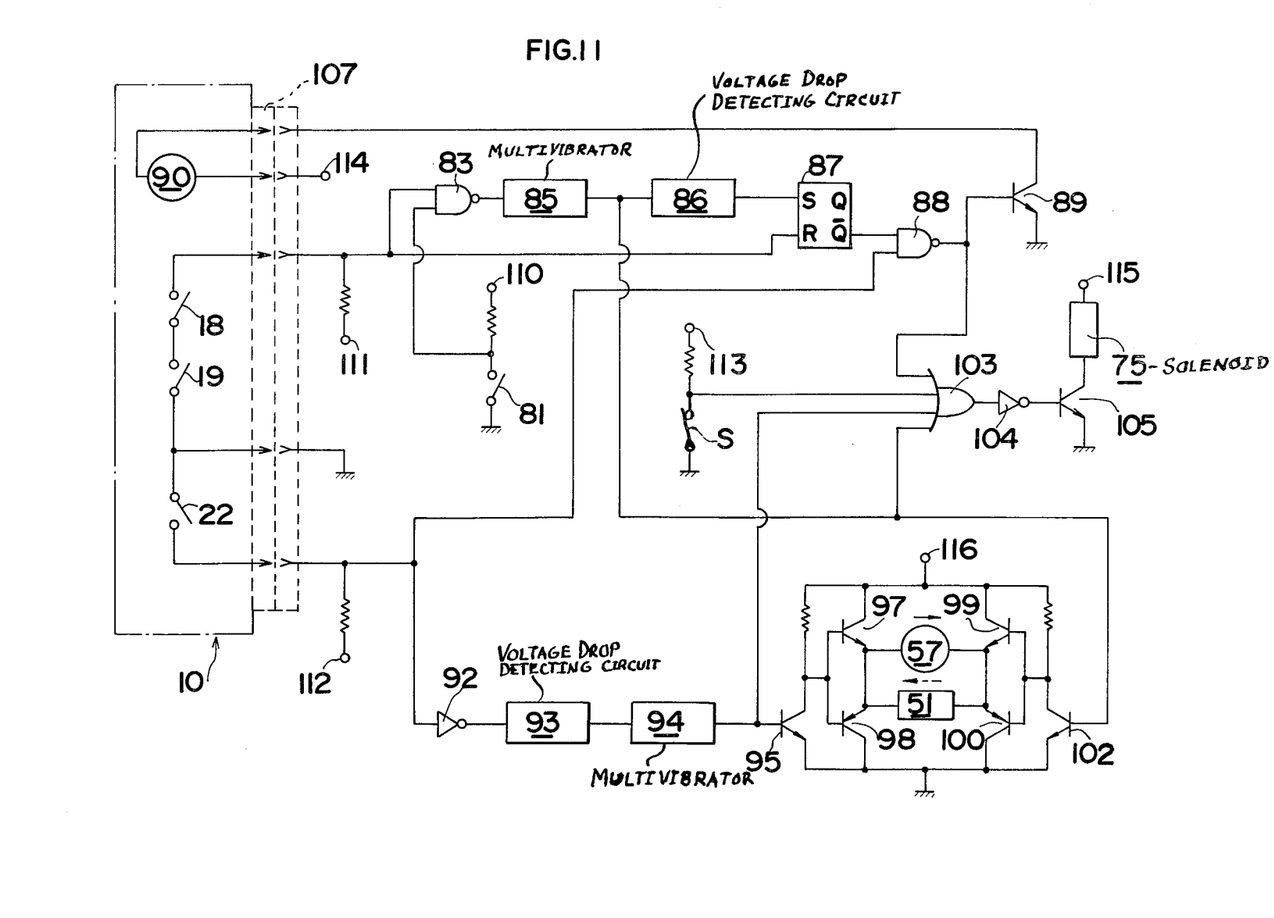
FIG. 11 is a schematic circuit diagram showing the main electric circuit of the aperture card reader.

When the unit 10 is removed from the reader main body, the portion of the electric circuit of FIG. 11 surrounded by the dot and dash line is disconnected at the connector 107 from the portion of the electric circuit in the main body. This eliminates the means for the control of the motors 57 and 90 and solenoids 51 and 75 by the operation of the switches 18, 19 and 22 as described above. Therefore when a card 24 is fed to and withdrawn from the presser plates, it must be done manually.

When the main switch (not shown) on the operation panel 3 on the front side of the reader 1 is closed, the terminals 110 to 116 are connected to the d-c power supply. The OR gate 103 produces an "L" output which causes energizng of the solenoid 75, thus moving the glass plate 72 on the movable presser plate 103 into contact with the glass plate 25 on the presser plate 27.

Subsequently the switch S shown in FIG. 3 is depressed to open its contact, whereby the output from the OR gate 103 and inverter 104 is changed to "H" to deenergize the solenoid 75 and permit the presser plates 25 and 68 to separate from each other and move to the open position under the action of spring 63. A card 24 can be inserted into the opening in the main body housing provided for mounting the unit 10 and the major sides of the card 24 oriented in the direction of insertion or the minor sides oriented in the direction of insertion. When the card is oriented with the major sides in the direction of feed, it must be inserted adjacent the end of the opening where the vertical surface 29 is located, i.e. the left end in FIGS. 3-10. With the card in either orientation, the leading end of the card pushes the semispherical pressing member 36 on the portion 34 of the plate spring 32 in the direction of the arrow shown in FIG. 8, also moving the biasing portion 35 of the same spring 32 in the same direction away from the path of feed of the card 24. Even if the biasing portion 35 is incompletely retracted, because the round edge 35a is provided it will not prevent the insertion of the card 24. The card 24 is further pressed against the glass plate 25 during insertion by the action of the plate spring 31 until it is eventually impeded by the contact of the leading end with the horizontal surface 28.

The card 24 is then slightly moved by hand so as to be positioned in the reference position between the presser plates, in which position the leading end and upper side of the card 24 are in contact with the horizontal surface 28 and vertical surface 29 respectively. When the depressed switch S is released, the OR gate 103 is reversed and the solenoid is energized to close the presser plates. The card 24 is held between the presser plates with its apertured portion 24' between the glass plates of the presser plates.

The card 24 thus held between the presser plates is in position for the enlargement and projection of the microfilm image held therein on the screen 2, or copying.

When projection is completed, the card 24 is withdrawn in the reverse manner to that described above. This procedure will therefore not be described.

The reader described above as an embodiment of the invention has, among other unique advantages, the following noticeable advantages:

(1) The card can be fed between the presser plates in two modes, namely automatically and manually. The preferred mode is easily selectable by mounting the automatic card feeding unit on the reader main body or detaching the unit therefrom.

(2) Since the card can be placed between the presser plates in either its vertical or horizontal position, the microfilm image on the card can always be projected in an upright position on the screen irrespective of the orientation of the image on the card.

(3) When the automatic card feeding unit is installed on the reader main body for automatic operation, a card already in the reader is automatically discharged from between the presser plates in response to the insertion of a card. This assures the automatic discharge of the card in the reader without the necessity of following a particular procedure.

(4) When the automatic card feeding unit is detached from the reader main body to permit a manual feeding operation, a card can be fed to the presser plates in a vertical position as well as a horizontal position, and moreover, a card of a size other than standard or even a microfilm itself can be fed into position for the projection of the image.

Although the present invention has been fully described by way of example with reference to the attached drawings, it should be noted that various changes and modifications will be apparent to those skilled in the art. Therefore unless otherwise such changes and modifications depart from the scope of the invention, they should be construed as being included therein.

The above description does not set forth the location of the discharge switch 81 shown in FIG. 11 because the switch 81 may be mounted on the operation panel 3 on the main body or on the frame 23 close to the inlet 4 of the unit 10. In the latter case, the switch 81 shown in FIG. 11 will be disconnected from the portion of the electric circuit in the main body along with the unit 10 and the portion of the electric circuit surrounded by the dot and dash line in FIG. 11.

The automatic card feeding unit 10 in the foregoing embodiment is supported on the reader main body housing for mounting and detachment by movement in a vertical direction. However, the mounting direction can be made horizontal if so desired. In such case, the unit 10, if shifted a predetermined amount in the horizontal direction (for example toward the front of the reader main body), can be retracted from the opening formed in the main body housing for manual feeding, permitting the insertion of cards into the opening from outside, so that the unit 10 merely has to be slidably supported on the main body housing and need not be detachable from the housing.

What is claimed is:

1. An aperture card reader comprising: a pair of aperture card holding presser plates each having a transparent portion through which light can be passed for projecting the image of a microfilm mounted in the apertured portion of an aperture card, said pair of presser plates being mounted for movement toward each other perpendicular to the plane of the opposed faces of said plates for holding an aperture card therebetween and movable away from each other to leave a space for receiving an aperture card; a reader main body housing having a first card feeding opening for permitting an aperture card to be fed into and withdrawn from the space between the presser plates from outside said housing and transversely of the direction in which the plates are movable, with the aperture card in a position in which the major sides of the aperture card are oriented in the direction of feeding or the minor sides of the aperture card are oriented in the direction of feeding; guide plates defining a second opening for feeding an aperture card into the space between the presser plates only in a position in which the minor sides of the aperture card are oriented in the direction of feed, said guide plates being disposed for guiding the aperture card from the second opening to the space between the presser plates through said first opening; a pair of feed rollers for automatically transporting an aperture card from the second opening along the guide plates; a support member on which said guide plates and feed rollers are mounted and which is mounted on said housing for moving the guide plates and the feed rollers away from said first opening of the housing; and a pair of discharge rollers in said housing for engaging the aperture card and discharging it from the housing after the aperture card has been feed from between the presser plates from said guide plates and held therebetween for projecting an image of the microfilm which is mounted on the aperture card, and the presser plates have been moved apart.

2. An aperture card reader as claim in claim 1, wherein one of said presser plates has a positioning member thereon having surfaces thereon against which the edges of the aperture card are placed for properly positioning the aperture card relative to the transparent portions of the presser plates, said surfaces extending in the direction in which the minor and major edges of the card are oriented.

3. An aperture card reader as claimed in claim 1, further comprising detecting means for detecting the leading end of an aperture card inserted into the second opening, and controlling means connected to said detecting means, said feed rollers, said discharge rollers and said presser plates for controlling the operation of said feed rollers and discharge rollers and the movement of said presser plates in response to the detection of the leading end of an aperture card by said detecting means.

4. An aperture card reader as claimed in claim 3, wherein said controlling means comprises means for holding said presser plates apart at least while said feed rollers or said discharge rollers are driven.

5. An aperture card reader as claimed in claim 4, wherein said controlling means comprises means for driving said discharge rollers for a period of time at least sufficient to discharge an aperture card which is between the presser plates from the main body housing in response to the detection of the leading end of an aperture card by said detecting means.

6. An aperture card reader as claimed in claim 5, wherein said controlling means comprises means for starting said feed rollers rotating when said discharge rollers stop rotating.

7. An aperture card reader as claimed in claim 6, further comprising means for detecting the rear end of an aperture card passing between the feed rollers and connected to said controlling means for supplying a rear end detecting signal to said controlling means.

8. An aperture card reader as claimed in claim 7, wherein said controlling means comprises means for stopping said feed rollers in response to the detection of the rear end of an aperture card by the rear end detecting means.

9. An aperture card reader as claimed in claim 3, wherein said discharge rollers are positioned for discharging an aperture card placed between the presser plates at right angles to the direction in which the aperture card is fed to the presser plates.

10. An aperture card reader as claimed in claim 9, wherein said discharge rollers are mounted for movement toward and away from the presser plates for moving into and out of contact with an aperture card between the presser plates, and said controlling means comprises means for holding said discharge rollers away from the presser plates at least when an aperture card is being fed between the presser plates.

11. An aperture card reader as claimed in claim 10, wherein said controlling means comprises means for driving said discharge rollers for a period of time in a direction opposite to the direction for discharging an aperture card from said housing to properly position the aperture card immediately before said presser plates are moved toward each other to hold the aperture card therebetween.

* * * * *